US009195835B2

(12) United States Patent
Movshovitz

(10) Patent No.: US 9,195,835 B2
(45) Date of Patent: Nov. 24, 2015

(54) SYSTEM AND METHOD FOR INITIALIZING TOKENS IN A DICTIONARY ENCRYPTION SCHEME

(71) Applicant: salesforce.com, inc., San Francisco, CA (US)

(72) Inventor: David Movshovitz, Tel Aviv (IL)

(73) Assignee: salesforce.com, inc., San Francisco, CA (US)

( * ) Notice: Subject to any disclaimer, the term of this patent is extended or adjusted under 35 U.S.C. 154(b) by 72 days.

(21) Appl. No.: 13/767,546

(22) Filed: Feb. 14, 2013

(65) Prior Publication Data
US 2013/0232341 A1 Sep. 5, 2013

Related U.S. Application Data

(60) Provisional application No. 61/605,334, filed on Mar. 1, 2012.

(51) Int. Cl.
*H04L 29/06* (2006.01)
*G06F 21/60* (2013.01)
*G09C 1/00* (2006.01)

(52) U.S. Cl.
CPC ............... *G06F 21/602* (2013.01); *G09C 1/00* (2013.01)

(58) Field of Classification Search
CPC ........................................................ H04L 9/08
USPC ............................................................ 713/189
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |

(Continued)

FOREIGN PATENT DOCUMENTS

| WO | 2010/026561 A2 | 3/2010 | |
| WO | 2011/104663 A1 | 9/2011 | |
| WO | WO2011104663 A1 * | 9/2011 | ................ H04L 9/00 |

*Primary Examiner* — Jason K Gee
(74) *Attorney, Agent, or Firm* — Ingrassia Fisher & Lorenz, P.C.

(57) ABSTRACT

Computer systems and applications are provided for encrypting data in a manner which preserves the ability to process the encrypted data. The method includes arranging a plurality of plaintext symbols in lexicographical order; defining respective first and second subsets of the lexicographically arranged symbols; defining a first and a second set of random tokens for use with the first and second subsets of symbols, respectively; adding a first random constant value to each token in the first set of random tokens; adding a second random constant value to each token in the second set of random tokens; defining the first set of random tokens comprises establishing a first average distance between tokens; and defining the second set of random tokens comprises establishing a second average distance between tokens; wherein the second average distance is different than the first average distance, and the second random constant value is greater than the first random constant value.

20 Claims, 5 Drawing Sheets

(56) References Cited

U.S. PATENT DOCUMENTS

| | | |
|---|---|---|
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,401,094 B1 | 7/2008 | Kesler |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0107346 A1* | 6/2004 | Goodrich et al. ............. 713/176 |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2013/0046995 A1* | 2/2013 | Movshovitz ................. 713/189 |

\* cited by examiner

400

| LETTER | RELATIVE FREQUENCY IN THE ENGLISH LANGUAGE |
|---|---|
| a | 8.167% |
| b | 1.492% |
| c | 2.780% |
| d | 4.253% |
| e | 12.702% |
| f | 2.288% |
| g | 2.022% |
| h | 6.094% |
| i | 6.973% |
| j | 0.153% |
| k | 0.747% |
| l | 4.025% |
| m | 2.517% |
| n | 6.749% |
| o | 7.507% |
| p | 1.929% |
| q | 0.098% |
| r | 5.987% |
| s | 6.333% |
| t | 9.056% |
| u | 2.758% |
| v | 1.037% |
| w | 2.465% |
| x | 0.150% |
| y | 1.971% |
| z | 0.074% |

FIG. 4

SYSTEM AND METHOD FOR INITIALIZING TOKENS IN A DICTIONARY ENCRYPTION SCHEME

CROSS-REFERENCE TO RELATED APPLICATION

This application claims the benefit of U.S. provisional patent application Ser. No. 61/605,334, filed Mar. 1, 2012, the entire content of which is incorporated by reference herein.

TECHNICAL FIELD

Embodiments of the subject matter described herein relate generally to computer systems and applications for token dictionary initialization and, more particularly, to a method for enhancing the security of an encryption dictionary used by the tokenization algorithm.

BACKGROUND

Systems and methods have been proposed for encrypting data in a manner which preserves the ability to perform limited processing on the encrypted data. Presently known techniques employ what are referred to as "encryption" dictionaries which map words to random tokens. However, one having access to the information encrypted by the tokenization using a standard token dictionary may derive a course estimation of at least the first letter of a plaintext word from the token value.

Systems and methods are thus needed for enhancing the security of encryption dictionaries.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures:

FIG. 4 is a table of relative letter frequency for the English language;

DETAILED DESCRIPTION

Embodiments of the subject matter described herein generally relate to systems and methods for encrypting information in a manner which preserves the ability to perform limited processing on the encrypted data, such as searching, sorting, and reporting functions.

In one embodiment, the application comprises computer code stored on or embodied in a computer readable medium such as a hard drive, removable drive, or network server, and the system includes an interactive user interface displayed on a computer monitor.

Figure 1:
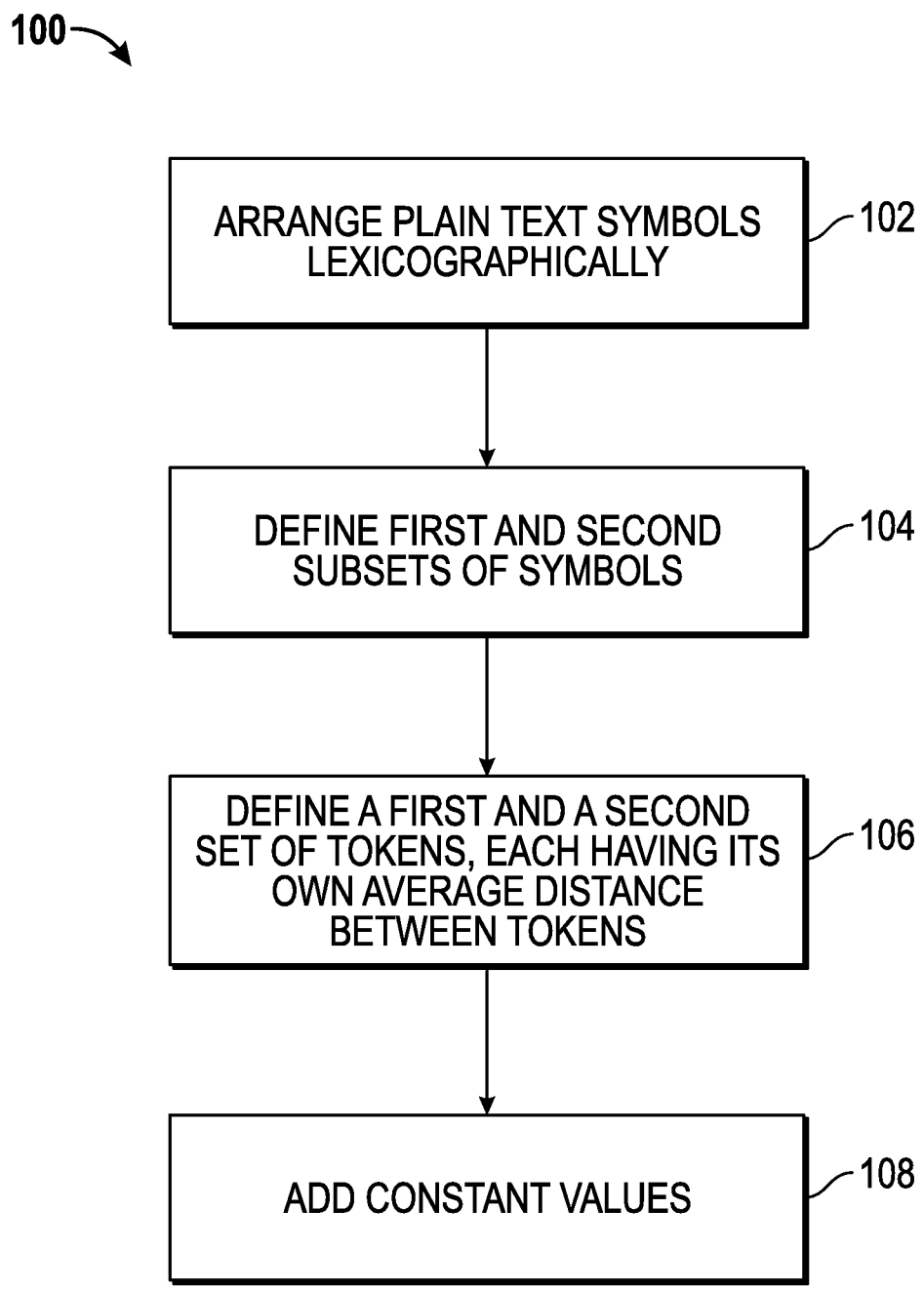
FIG. 1 is a flow chart illustrating a method of generating an encryption dictionary in accordance with an embodiment.

Turning now to FIG. 1, a flow chart illustrating a method 100 for generating an encryption dictionary is shown. More particularly, method 100 includes arranging (task 102) a plurality of plaintext symbols in lexicographical order; defining (task 104) first and second subsets of the lexicographically arranged symbols; defining (task 106) first and second sets of random tokens, each having its own average distance between tokens; and adding (task 108) a first and second random constant values to each token in the first and second sets of random tokens, respectively.

In accordance with various embodiments, order preserved encryption (OPE) (also referred to as sort enabled encryption) involves encrypting information prior to storage in a manner which preserves the ability to perform limited processing on the encrypted data, such as searching, sorting, and reporting functions. According to some embodiments there is provided a symbol based encryption module adapted to encrypt data, such as a document or an application request/transaction, on a per symbol basis. In this context, the term symbol (or data element) may include a word, phrase, number, or any set of characters including alphanumeric characters in any known language.

Presently known encryption modules and techniques employ an encryption dictionary which maps symbols (words) to a unique random token. The encryption dictionary can be a data structure in any format. The term "random token" may mean any data element that is generated by a process that includes at least one stage that is random or pseudo-random.

According to an embodiment, there is provided a sort and search preserved encryption module that may permit sort and search preserving encryption that allows other modules (or other computerized entities) that may not be aware of the plaintext symbols to sort random tokens, to search for random tokens, or to perform both sort and search processes on random tokens.

The computer implemented methods described herein can be used in various environments and operate in various scenarios. For example, when a tenant is using a customer relationship management (CRM) application in a multitenant environment, tenant data maintained by the multitenant service provider may contain sensitive data elements. The application protocol is configured to detect the sensitive data elements embodied in a hyper text transfer protocol (HTTP) request sent by the tenant to the multitenant database provider, and to encrypt the sensitive data elements using a symbol based encryption scheme that preserves the ability to sort and search the encrypted data.

Thus, the HTTP request structure remains the same, but with the sensitive data elements being replaced with encrypted elements, allowing the search/sort request to be processed in the ordinary course. The sort and search preserved encryption enables the multitenant database provider to search within the encrypted data elements (e.g., to search for a contact given the contact name), to sort the encrypted data elements (e.g., to sort contact names in a lexicographical order), and to prepare reports using the encrypted data elements while the values of the sensitive data elements remain encrypted. As a result, even if there is leakage of information from the server side applications and databases (e.g., in the event of a security breach or "hacking" incident), there is no exposure of sensitive information per se.

To preserve the ability to sort the encrypted values and to search within the encrypted data space, the encryption scheme in accordance with the present disclosure replaces each data element with a random token in such a way that the lexicographic (alphabetical) order of the plaintext elements represented by the tokens is preserved. According to various embodiments, the encryption module can generate random tokens, order the random tokens according to increasing numerical value, and assign a unique random token to lexicographically ordered plaintext symbols to thereby create an encryption dictionary. The size of the random tokens can be 64 bits, 128 bits, 256 bits, or any other size.

Based on the size of the random tokens, the encryption module generates random tokens for the plaintext symbols so that the order (e.g., the lexicographic order) between the random tokens generated for the data elements in the encryption dictionary preserves the order between the clear text data elements they represent. This mapping between the random tokens and their corresponding clear text symbols may be stored in a hash table in memory and, additionally or alternatively, in a database.

Figures 2, 3:
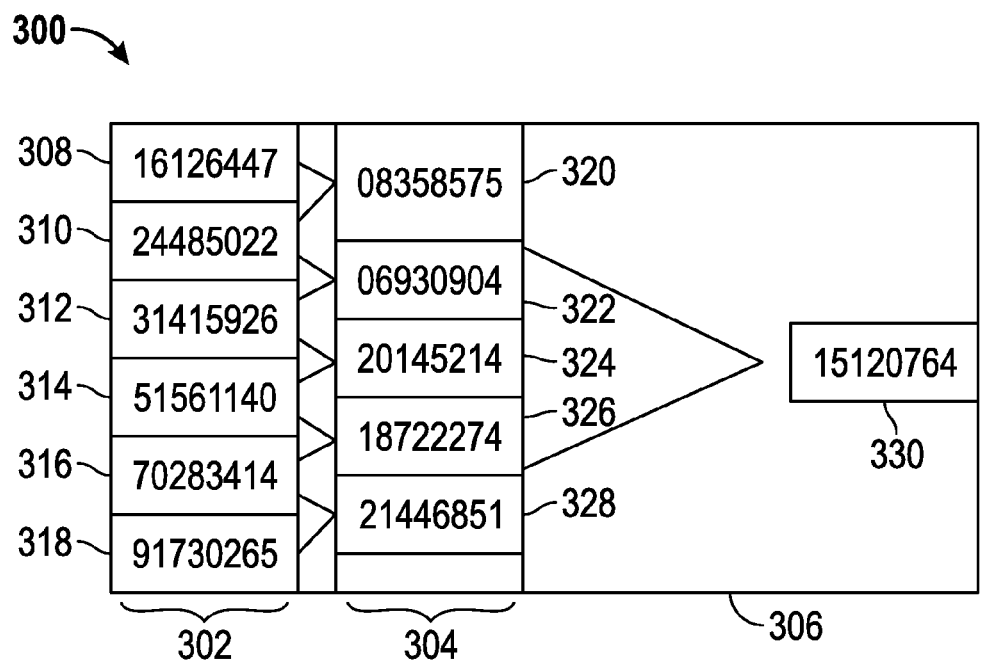
FIG. 2 is an exemplary section of an encryption dictionary in accordance with an embodiment.
FIG. 3 is a block diagram of a block of tokens illustrating the derivation of the average distance between token values in accordance with an embodiment.

FIG. 2 is an exemplary portion of an encryption dictionary 200 in accordance with an embodiment. More particularly, dictionary 200 includes a plurality of symbols 202 such as, for example, English language words ordered lexicographically; corresponding respective random tokens 204 arranged in a logical order such as, for example, increasing numerical value; and corresponding respective indices 206. For clarity and to facilitate this description the tokens are expressed as eight (8) digits in base 10 notation, it being understood that any suitable implementation of the tokens may be employed such as, for example, binary notation. Thus, dictionary 200 includes a plurality of symbol entries 208(a)-208(f), each having a symbol (e.g., a word), a token, and an index.

By way of non-limiting example, entry 208(f) includes the symbol (word) 210 "zebra", the token 212 "91730265", and the index 214 "6.07" (discussed in greater detail below). Note that the symbols 202 are ordered lexicographically from top to bottom, and that the tokens 204 are ordered from low to high from top to bottom, thereby preserving the ordered characteristic of the plaintext symbols even after encryption.

FIG. 3 is a block of tokens 300 illustrating the derivation of an average numerical distance between tokens in accordance with presently known hacking techniques. More particularly, the token values 302 (analogous to tokens 204 from FIG. 2) are shown as individual tokens 308-318 and again ordered chronologically, with the difference between successive tokens shown in a difference column 304. The average distance between the illustrated tokens is represented by a global average value 330.

Specifically, and with continued reference to FIG. 3, the difference between token 310 ("24485022") and token 308 ("16126447") is set forth as average value 320 ([24485022]–[16126447]=[08358575]); the difference between token 312 ("31415926") and token 310 ("24485022") is set forth as average value 322 ([31415926]–[24485022]=[06930904]), and so on. Global average value 330 ("15120764") is simply the arithmetic average of all individual average values 304.

Referring again to FIG. 2, the respective index values 206 for each entry 208(a)-208(f) are computed by dividing an individual token value 204 by the global average distance value 330. For example, the index value 214 ("6.07") for symbol entry 208(f) ("zebra") may be calculated by dividing token value 212 ("91730265") by global average 330 ("15120764"), i.e., [91730265]/[15120764]=[6.07]. Respective index values 206 for the other symbol entries 208 may be similarly computed.

Figure 5:
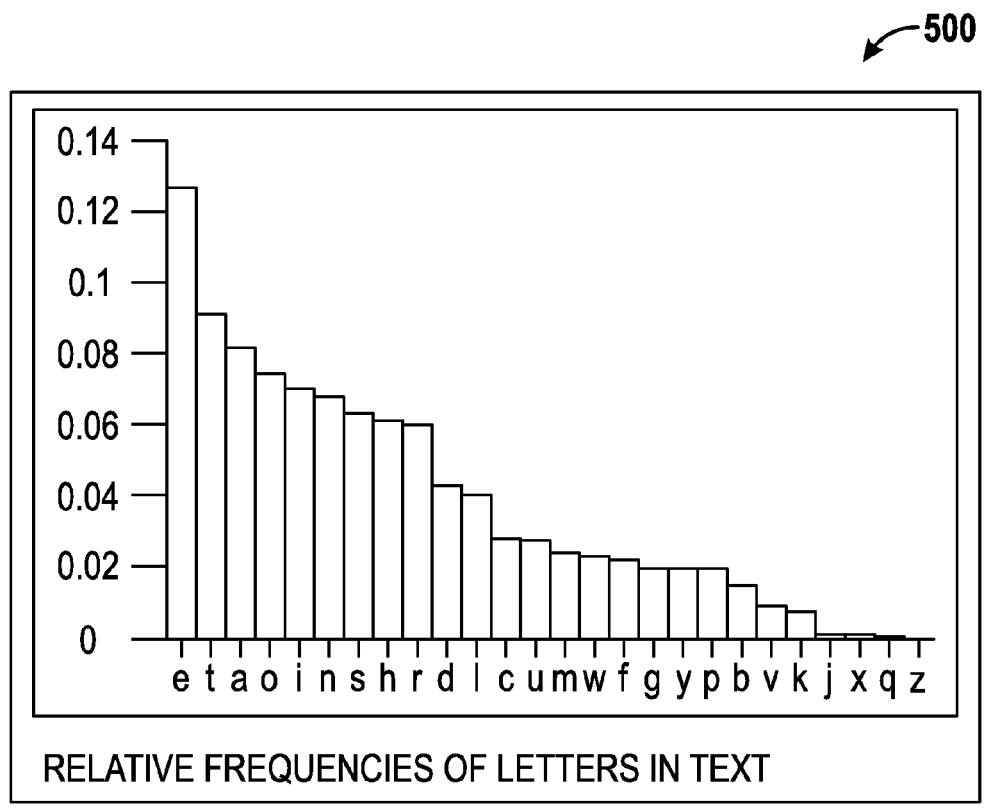
FIG. 5 is a bar graph illustrating relative English language letter frequency, ordered by frequency.
Figure 6:
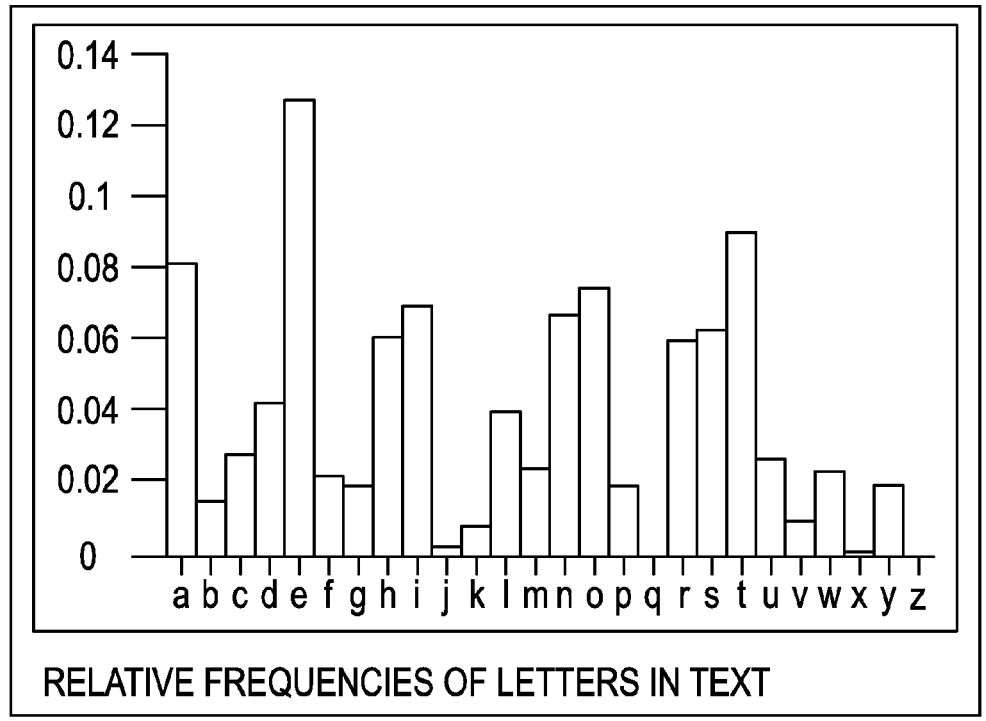
FIG. 6 is a bar graph illustrating relative English language letter frequency, ordered lexicographically.

More particularly and referring now to FIGS. 4-6, it is known that in most languages of the world certain letters occur more frequently than others. FIG. 4 is a table 400 of relative letter frequency for the English language. FIG. 5 is a bar graph 500 illustrating relative English language letter frequency, ordered by frequency, and FIG. 6 is a bar graph 600 illustrating relative English language letter frequency, ordered lexicographically. In this way, a hacker or intruder with knowledge of basic dictionary encryption paradigms may derive course estimates of clear text words from the encrypted data without authorization.

Figure 7:
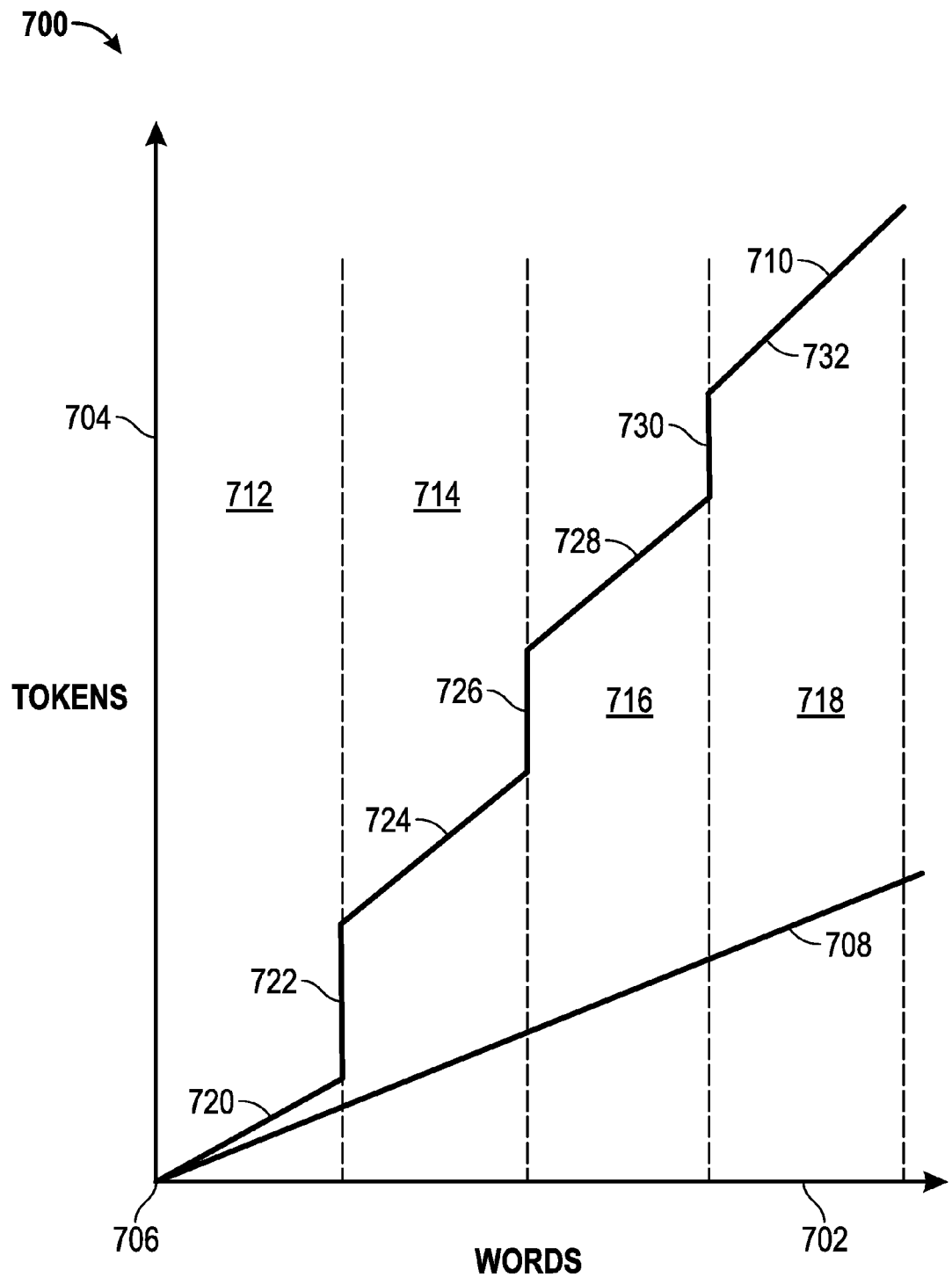
FIG. 7 is a plot representing dictionary word entries versus encryption token values in accordance with an embodiment.

The manner in which the present disclosure resolves these vulnerabilities will now be described in conjunction with FIG. 7. Referring now to FIG. 7, a plot 700 representing dictionary word entries versus encryption token values in accordance with an embodiment is shown. More particularly, plot 700 graphically depicts lexicographically ordered symbols or words along an X-axis 702, and chronologically ordered token values along a Y-axis 704, both emanating from an origin 706 in a Cartesian coordinate system. At a high level of abstraction, plot 700 illustrates up and down variations (not shown) around an approximately linear slope 708 representing a plot of words versus tokens in a conventional encryption dictionary implementation. In contrast, a broken line 710 represents a non-linear plot of words versus tokens in an encryption dictionary constructed in accordance with the present disclosure.

Approximately linear slope 708 represents a rough approximation of a plot of words versus tokens. In particular, inasmuch as the words are ordered lexicographically and the tokens are arranged chronologically, a one-to-one mapping of each word (along the X-axis) versus its associated token (along the Y-axis) may be fairly approximated by a straight line, as is known in the art.

However, the very predictability of this approach reveals a key vulnerability, namely, that an attacker can use the average index of the symbol to obtain an estimation to the range of possible words that the symbol can correspond to. Since all this range of words typically start with the same letter, the attacker can extract from the index the first letter of the word (symbol) corresponding to the token. Specifically, an index value 214 for a particular token may be used to reference the plaintext dictionary and thereby provide a reasonable guess of the first letter of the plaintext word. Moreover, a hacker can also guess the first letter of the plaintext word according to the number of tokens in a certain range due to the fact that the number of words in English that start with a given letter has a very non-flat distribution (See FIGS. 4-6).

It is therefore advantageous to generate an encryption dictionary, that is, to map random tokens to lexicographically ordered symbols, using a non-linear mapping technique while preserving the underlying cryptographic algorithm for generating the random tokens, as described more fully below. In an embodiment, the token space may be increased for those letters which occur more frequently, and decreased for those letters which occur less frequently.

Returning now to FIG. 7, broken line 710 includes a first segment 720, a first step 722, a second sloped segment 724, a second step 726, a third sloped segment 728, a third step 730, and a fourth sloped segment 732. In an embodiment, the foregoing steps 722, 726, and 730 represent discrete discontinuities interposed between and thus separating the sloped segments 720, 724, 728, and 732 from one another. In a further embodiment, the slope associated with segment 724 is at least as great as the slope associated with segment 720; the slope of segment 728 is greater than or equal to the slope of segment 724; and the slope of segment 732 is greater than or equal than the slope of segment 728.

More particularly, plot 700 may include adjacent regions 712, 714, 716, and 718 (and additional regions as desired). The slope of segment 724 may be configured to be greater than the slope of segment 720 by employing an average distance between tokens for successive words in region 714 which is greater than the average distance between tokens in region 712, and so on. For example, the average distance between token values in an exemplary embodiment may be as follows: 40 bit random numbers are used in region 712; 38 bit random numbers in region 714; 42 bit random numbers in region 716, and 43 bits in region 718.

In this way, the relationships between token values and symbols embodied in broken line 710 preserve the basic premise of presently known dictionary encryption algorithms, yet at the same time mitigate the security risks relating to guessing the first letter of a plaintext word.

Significantly, broken line 710 departs from the conventional dictionary encryption paradigm in that it includes segments of increasing and/or decreasing slopes separated by steps. In this manner and to these extents the aforementioned vulnerability, namely, a hacker's ability to estimate a plaintext word based on a token value, is concomitantly reduced. Moreover, the improved dictionary encryption scheme embodied in broken line 710 is less vulnerable to security breach and the leakage of sensitive information for these same reasons. The manner in which the differential slopes and interstitial steps are created during generation of an encryption dictionary in accordance with the present disclosure will now be described with continued reference to FIG. 7.

In accordance with an embodiment, steps 722, 726, and 730 (and additional steps, if desired) may be interposed into an encryption dictionary "symbol versus word" plot by using a random event, such as an electronic coin toss or other binary event having a predetermined average occurrence value. By way of non-limiting example, suppose a coin flipper is configured to randomly output a binary "1" (analogous to "heads") every one thousand flips, and to otherwise output a binary "0" (analogous to "tails"). At an appropriate stage in the generation of the random tokens, a "step value" such as a 20 bit random value, a 40 bit random value, a 45 bit random value, or the like could be added to the then current value of the random token being generated each time the coin flipper outputs a binary "1".

With continued reference to FIG. 7, plot 700 further includes a first region 712, second region 714, third region 716, and fourth region 718 (additional regions could also be added, if desired). The division between regions represents a binary "1" value of the coin flipper. Thus, at step 722 (transitioning from region 712 to region 714), a 40 bit random value may be added to each token. Similarly, at step 726, another 40 bit random value may be added to the latest token to generate the next token, and so on. Although the output of the coin flipper is random, it may be configured to output an event which triggers a step increase on a predictable, average basis. In the illustrated example, the precise location along the—axis at which a step occurs is a random event, but the average distance is every 1,000 words.

In addition to the aforementioned random shifts (steps), broken line 710 also exhibits an increasing and/or decreasing slope value which, in the illustrated embodiment, coincides with the step changes along the X-axis. More particularly, the algorithm used to generate the encryption dictionary may be enhanced to yield increasing and decreasing slopes for various segments such as, for example, sloped segments 724, 728, and 732.

A method of generating an encryption dictionary is provided. The method includes: arranging a plurality of plaintext symbols in lexicographical order; defining respective first and second subsets of the lexicographically arranged symbols; defining a first set of random tokens within a first token space for use with the first subset of symbols; defining a second set of random tokens within a second token space for use with the second subset of symbols; adding a first random constant value to each token in the first set of random tokens; and adding a second random constant value to each token in the second set of random tokens; wherein the second random constant value is greater than the first random constant value. Although one embodiment of the method is described in terms of first and second subsets, those skilled in the art will appreciate that the method may be generalized to three, four, and up to "N" subsets, where N is any positive integer.

The method further includes establishing a first average distance between tokens of the first set, and establishing a second average distance between tokens of the second set such that the second average distance is different than the first average distance, and wherein the plaintext symbols comprise a plaintext dictionary of words, numbers, and/or alphanumeric combinations in one of the following languages: English; French; German; Italian; Polish; Swedish; Dutch; Turkish; and Esperanto.

The method further includes sorting the first set of random tokens in chronological order; sorting the second set of random tokens in chronological order; mapping a respective one of the first set of random tokens to a respective one of the first subset of symbols; and mapping a respective one of the second set of random tokens to a respective one of the second subset of symbols.

In an embodiment, the first average distance is in the range of $(2)^0$ to $(2)^{1024}$, the second average distance is in the range of $(2)^0$ to $(2)^{1024}$ bits, and the difference between the second average distance and the first average distance is in the range of $(2)^0$ to $(2)^{1024}$ bits.

In a further embodiment of the method, defining respective first and second subsets of the lexicographically arranged symbols involves segregating the plurality of plaintext symbols based on a random coin flip event.

In yet a further embodiment the symbols correspond to a language having a non-linear letter frequency such that a first letter has a relatively greater frequency of occurrence than a second letter; the first token space corresponds to the first letter; the second token space corresponds to the second letter; and the first token space is greater than the first token space, such that the letter frequency corresponds to the average distance for each token space.

The method further involves: defining a third subset of the lexicographically arranged symbols; defining a third set of random tokens within a third token space for use with the third subset of symbols; and adding a third random constant value to each token in the third set of random tokens; wherein the third random constant value is different than the second random constant value.

In another embodiment defining the third set of random tokens involves establishing a third average distance between tokens, and wherein the third average distance is different (e.g., greater than) than the second average distance.

In a cloud based computing environment of the type including a multitenant database maintained by a service provider, a method of generating an encryption dictionary is provided which includes: alphabetically sorting a plurality of plaintext symbols; defining respective first and second subsets of the symbols; and defining a first set of random tokens within a first token space for use with the first subset of symbols and defining a second set of random tokens within a second token space for use with the second subset of symbols;

wherein defining the first set of random tokens involves establishing a first average distance between tokens, defining the second set of random tokens involves establishing a second average distance between tokens, and the second average distance is different than (e.g., greater than) the first average distance.

The method further includes adding a first random constant value to each token in the first set of random tokens, and adding a second random constant value to each token in the second set of random tokens, wherein the second random constant value is different than (e.g., greater than) the first random constant value.

In an embodiment, the method also includes sorting the first set of random tokens in chronological order; sorting the second set of random tokens in chronological order; mapping a respective one of the first set of random tokens to a respective one of the first subset of symbols; and mapping a respective one of the second set of random tokens to a respective one of the second subset of symbols.

In an embodiment, the method further involves defining a third subset of the alphabetically sorted symbols; defining a third set of random tokens within a third token space for use with the third subset of symbols; and adding a third random constant value to each token in the third set of random tokens; wherein the third random constant value is different than the second random constant value. The method includes establishing a third average distance between tokens in the third set, wherein the third average distance is different than (e.g., greater than) the second average distance.

A computer application embodied in a non-transitory medium is provided for operation by a computer processor for performing the steps of: arranging a plurality of plaintext symbols in lexicographical order; defining respective first and second subsets of the lexicographically arranged symbols; defining a first set of random tokens within a first token space for use with the first subset of symbols; defining a second set of random tokens within a second token space for use with the second subset of symbols; adding a first random constant value to each token in the first set of random tokens; adding a second random constant value to each token in the second set of random tokens; defining the first set of random tokens comprises establishing a first average distance between tokens; and defining the second set of random tokens comprises establishing a second average distance between tokens; wherein the second average distance is different than the first average distance and wherein the second random constant value is different than (e.g., greater than) the first random constant value.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, database querying, database statistics, query plan generation, XML and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A computer implemented method, comprising:
   receiving data in unencrypted form, the data including a plurality of plaintext symbols;
   encrypting the data in accordance with an encryption dictionary generated by
   arranging the plurality of plaintext symbols in lexicographical order;
   defining a first subset comprising a first plurality of the lexicographically arranged symbols;
   defining a second subset comprising a second plurality of the lexicographically arranged symbols;
   defining a first set comprising a first plurality of unique random tokens within a first token space for use with the first plurality of symbols, respectively;

defining a second set comprising a second plurality of unique random tokens within a second token space for use with the second plurality of symbols, respectively;

adding a first random constant value to each token in the first set of random tokens; and adding a second random constant value to each token in the second set of random tokens;

wherein the second random constant value is greater than the first random constant value; and storing the encrypted data in a database.

2. The method of claim 1, wherein:

defining the first set of random tokens comprises establishing a first average distance between tokens; and defining the second set of random tokens comprises establishing a second average distance between tokens;

wherein the second average distance is different than the first average distance.

3. The method of claim 2, wherein the plaintext symbols comprise a plaintext dictionary of words in one of the following languages: English; French; German; Italian; Polish; Swedish; Dutch; Turkish; and Esperanto.

4. The method of claim 2, further comprising:

sorting the first set of random tokens in chronological order;

sorting the second set of random tokens in chronological order;

mapping a respective one of the first set of random tokens to a respective one of the first subset of symbols; and mapping a respective one of the second set of random tokens to a respective one of the second subset of symbols.

5. The method of claim 2, wherein the first average distance is in the range of $(2)^0$ to $(2)^{1024}$ bits, and the second average distance is in the range of $(2)^0$ to $(2)^{1024}$ bits.

6. The method of claim 2, wherein the difference between the second average distance and the first average distance is in the range of $(2)^0$ to $(2)^{1024}$ bits.

7. The method of claim 2, wherein the plaintext symbols comprises words, numbers, and alphanumeric combinations in one of the following languages: English; French; German; Italian; Polish; Swedish; Dutch; Turkish; and Esperanto.

8. The method of claim 2, wherein defining respective first and second subsets of the lexicographically arranged symbols comprises segregating the plurality of plaintext symbols based on a random coin flip event.

9. The method of claim 2, wherein:

the symbols correspond to a language having a non-linear letter frequency such that a first letter has a relatively greater frequency of occurrence than a second letter;

the first token space corresponds to the first letter;

the second token space corresponds to the second letter; and the first token space is greater than the second token space, such that the letter frequency corresponds to the average distance for each token space.

10. The method of claim 2, further comprising:

defining a third subset of the lexicographically arranged symbols;

defining a third set of random tokens within a third token space for use with the third subset of symbols; and adding a third random constant value to each token in the third set of random tokens;

wherein the third random constant value is different than the second random constant value.

11. The method of claim 10, wherein defining the third set of random tokens comprises establishing a third average distance between tokens, and wherein the third average distance is greater than the second average distance.

12. In a cloud based computing environment of the type including a multitenant database maintained by a service provider, a method comprising:

receiving data in unencrypted form, the data including a plurality of plaintext symbols;

encrypting the data in accordance with an encryption dictionary generated by alphabetically sorting the plurality of plaintext symbols;

defining a first subset comprising a first plurality of the symbols;

defining a second subset comprising a second plurality of the symbols;

defining a first set comprising a first plurality of random tokens within a first token space for use with the first subset of symbols, respectively; and defining a second set comprising a second plurality of random tokens within a second token space for use with the second subset of symbols, respectively;

wherein:

defining the first set of random tokens comprises establishing a first average distance between tokens; and defining the second set of random tokens comprises establishing a second average distance between tokens; and the second average distance is different than the first average distance; and storing the encrypted data in the multitenant database.

13. The method of claim 12, further comprising:

adding a first random constant value to each token in the first set of random tokens; and adding a second random constant value to each token in the second set of random tokens;

wherein the second random constant value is greater than the first random constant value.

14. The method of claim 13, wherein the plaintext symbols comprise a plaintext dictionary of words in one of the following languages: English; French; German; Italian; Polish; Swedish; Dutch; Turkish; and Esperanto.

15. The method of claim 13, further comprising:

sorting the first set of random tokens in chronological order;

sorting the second set of random tokens in chronological order;

mapping a respective one of the first set of random tokens to a respective one of the first subset of symbols; and mapping a respective one of the second set of random tokens to a respective one of the second subset of symbols.

16. The method of claim 13, wherein the first average distance is in the range of $(2)^0$ to $(2)^{1024}$ bits, and the second average distance is in the range of $(2)^0$ to $(2)^{1024}$ bits.

17. The method of claim 13, wherein the difference between the second average distance and the first average distance is in the range $(2)^0$ to $(2)^{1024}$ bits.

18. The method of claim 17, further comprising:

defining a third subset of the alphabetically sorted symbols;

defining a third set of random tokens within a third token space for use with the third subset of symbols; and adding a third random constant value to each token in the third set of random tokens;

wherein the third random constant value is different than the second random constant value.

19. The method of claim 18, wherein defining the third set of random tokens comprises establishing a third average distance between tokens, and wherein the third average distance is different than the second average distance.

20. A computer application embodied in a non-transitory medium for operation by a computer processor for performing the steps of:

receiving data in unencrypted form, the data including a plurality of plaintext symbols;

encrypting the data in accordance with an encryption dictionary generated by arranging the plurality of plaintext symbols in lexicographical order;

defining a first subset comprising a first plurality of the lexicographically arranged symbols;

defining a second subset comprising a second plurality of the lexicographically arranged symbols;

defining a first set comprising a first plurality of random tokens within a first token space for use with the first subset of symbols, respectively;

defining a second set comprising a second plurality of random tokens within a second token space for use with the second subset of symbols, respectively;

adding a first random constant value to each token in the first set of random tokens;

adding a second random constant value to each token in the second set of random tokens;

defining the first set of random tokens comprises establishing a first average distance between tokens; and defining the second set of random tokens comprises establishing a second average distance between tokens;

wherein the second average distance is different than the first average distance; and wherein the second random constant value is different than the first random constant value; and storing the encrypted data in a database.

* * * * *